(12) United States Patent
Chen et al.

(10) Patent No.: US 6,770,221 B1
(45) Date of Patent: Aug. 3, 2004

(54) SINGLE-COMPONENT WHITE-EMITTING ELECTROLUMINESCENT PHOSPHOR AND METHOD OF MAKING SAME

(75) Inventors: Xianzhong Chen, Sayre, PA (US); Robert L. Stevens, Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 5 days.

(21) Appl. No.: 10/367,036

(22) Filed: Feb. 14, 2003

(51) Int. Cl.$^7$ .......................... C09K 11/56; C09K 11/54
(52) U.S. Cl. ......................... 252/301.6 S; 252/301.4 R; 313/503
(58) Field of Search ................... 313/503; 252/301.6 S, 252/301.5, 301.6 R, 301.6 F, 301.6 P, 301.4 R, 301.4 S, 301.4 P, 301.4 F, 301.4 H

(56) References Cited

U.S. PATENT DOCUMENTS 6,682,664 B1 * 1/2004 Chen et al. ........... 252/301.6 S

* cited by examiner

*Primary Examiner*—C. Melissa Koslow
(74) *Attorney, Agent, or Firm*—Robert F. Clark

(57) ABSTRACT

A single-component white-emitting electroluminescent phosphor and its method of making are described. The single-component phosphor exhibits a white emission having an x color coordinate of 0.23 to 0.41 and a y color coordinate of 0.25 to 0.42. The phosphor is comprised of zinc sulfide activated with copper, manganese, chlorine, and, optionally, one or more metals selected from gold and antimony.

21 Claims, No Drawings

SINGLE-COMPONENT WHITE-EMITTING ELECTROLUMINESCENT PHOSPHOR AND METHOD OF MAKING SAME

TECHNICAL FIELD

This invention relates to zinc sulfide-based electroluminescent phosphors. More specifically, it relates to zinc sulfide-based electroluminescent phosphors co-activated with manganese and copper.

BACKGROUND OF THE INVENTION

Current commercial white-emitting electroluminescent (EL) phosphors are made by blending green-emitting, blue-emitting, and orange-yellow-emitting EL phosphors in appropriate ratios. The major disadvantages of this blending method are that (1) the color emitted by the EL lamp is not homogeneous upon being closely examined because the particles of the three phosphor components emit different colors; (2) the emitted color of the lamp shifts with time because the brightness decay curves of the three phosphors are different; and (3) depending on the particular brightness of each component, the blending ratio may have to be adjusted several times in order to obtain desired color. Therefore, it would be an advantage to have a single-component white-emitting EL phosphor.

SUMMARY OF THE INVENTION

It is an object of the invention to obviate the disadvantages of the prior art.

It is another object of the invention to provide a single-component white-emitting electroluminescent phosphor.

It is a further object of the invention to provide a zinc sulfide-based electroluminescent phosphor having a white emission when stimulated in a thick-film electroluminescent lamp.

It is yet another object of the invention to provide a method for making a single-component white-emitting electroluminescent phosphor.

In accordance with one object the invention, there is provided a single-component white-emitting electroluminescent phosphor having an emission having an x color coordinate of 0.23 to 0.41 and a y color coordinate of 0.25 to 0.42.

In accordance with another object of the invention, the single-component white-emitting electroluminescent phosphor comprises zinc sulfide activated with copper, manganese, chlorine, and, optionally, one or more metals selected from gold and antimony.

In accordance with still another object of the invention, there is provided a method for making a single-component white-emitting electroluminescent phosphor comprising:

(a) forming a first mixture by combining amounts of zinc sulfide, a source of copper, zinc oxide, sulfur, a chloride-containing flux, and, optionally, a source of one or more metals selected from gold and antimony;

(b) firing the first mixture in air at a temperature from about 1100° C. to about 1250° C. for about 3 to about 5 hours to form a first-fired material;

(c) washing the first-fired material to remove the flux;

(d) mulling the first-fired material to induce defects in the crystal structure;

(e) washing the first-fired material to further remove flux residues and copper sulfides;

(f) forming a second mixture by combining the first-fired material with amounts of a copper source, a manganese source, and zinc oxide;

(g) firing the second mixture in air at a temperature from about 700° C. to about 950° C. for about 2 to about 5 hours to form a second-fired material; and (h) washing the second-fired material to remove chemical residues to form the phosphor.

DETAILED DESCRIPTION OF THE INVENTION

For a better understanding of the present invention, together with other and further objects, advantages and capabilities thereof, reference is made to the following disclosure and appended claims.

A single-component white-emitting electroluminescent phosphor has been invented. The white emission of the single-component phosphor has an x color coordinate of 0.23 to 0.41 and a y color coordinate of 0.25 to 0.42. More preferably, the white-emitting phosphor exhibits an x color coordinate of 0.28 to 0.38 and a y color coordinate of 0.28 to 0.38. Even more preferably, the white-emitting phosphor exhibits an x color coordinate of 0.31 to 0.35 and a y color coordinate of 0.32 to 0.38. The white-emitting phosphor comprises zinc sulfide activated with copper, manganese, chlorine, and, optionally, one or more metals selected from gold and antimony. The phosphor exhibits a brightness of greater than 7 foot-Lamberts (ft-L) when stimulated in a conventional thick-film electroluminescent lamp.

The phosphor preferably contains from about 0.1 to about 0.6 weight percent manganese, about 0.02 to about 0.08 weight percent copper, about 0.002 to about 0.02 weight percent chlorine, 0 to about 0.012 weight percent gold, and 0 to about 0.0007 weight percent antimony. It should be noted that the amount of antimony retained in the finished phosphor may be very difficult to detect. In these cases, it is assumed that when antimony is added during the first firing step some antimony will be retained even though it may not be detected in the chemical analysis of the finished phosphor.

The single-component phosphor of this invention is made in two firing steps. In the first firing step, zinc sulfide (ZnS) is blended with appropriate amounts of a source of copper (Cu), zinc oxide (ZnO), sulfur (S), a chloride-containing flux, and, optionally, a source of one or more metals selected from gold and antimony. Preferably, the Au source is a pre-mixture of gold chloride ($AuCl_3$) and ZnS, the Cu source is anhydrous copper sulfate ($CuSO_4$), and the Sb source is a pre-mixture of antimony oxide ($Sb_2O_3$) and ZnS. The chloride-containing flux can be a mixture of alkali metal and alkaline earth chlorides, preferably barium chloride ($BaCl_2$), magnesium chloride ($MgCl_2$), and sodium chloride (NaCl). The blended mixture preferably contains in weight percent (wt. %) relative to the weight of ZnS: 0 to 0.018 wt. % Au, 0.02 to 0.1 wt. % Cu, 0 to 0.01 wt. % Sb, 0.3 to 0.7 wt. % ZnO, 6 to 12 wt. % sulfur, and 4 to 14 wt. % chloride flux (preferably 0–4 wt. % of barium chloride, 1–5 wt. % of magnesium chloride, and 1–5 wt. % of sodium chloride).

The blended mixture is fired in air at a temperature from about 1100° C. to about 1250° C. for about 3 to about 5 hours. A fast cooling after the first firing is preferred but is not critical. The fast cooling is achieved by placing the red hot crucible into a water bath. Water is kept running to maintain the water bath at <60° C. The fired material is then water washed, dried, and gently mulled (low-intensity milling) to induce defects in its crystal structure. The mulling time depends on the particular type of equipment used and the amount of material being mulled. An optimum mulling time can be readily determined by one skilled in the art of electroluminescent phosphors. In our case, a typical mulling time was 75 minutes for 500 to 550 g of material.

After mulling, the material is washed with acid and then a basic solution containing sodium hydroxide (NaOH), hydrogen peroxide ($H_2O_2$), and a chelating agent, such as diethylenetriaminepentaacetic acid (DTPA). In a preferred method, the basic solution contains relative to the phosphor weight: 2–4 wt. % DTPA, 2.5–3.5 wt. % NaOH, and 5–15 wt. % of a 30% $H_2O_2$ solution. This chemical wash further removes flux residues and copper sulfides from the phosphor surface. A KCN solution (about 0.73 M) may be used in place of the basic solution to remove the copper sulfide residue. The material is then washed with hot deionized water and then dried to complete the first firing step.

In the second firing step, the material from the first firing step is blended with appropriate amounts of a copper source, a manganese source, and zinc oxide. Preferably, the material from the first firing step is blended with 0.2–0.8 wt. % anhydrous copper sulfate ($CuSO_4$), 0.7–7 wt. % manganese carbonate ($MnCO_3$), and 5–15 wt. % zinc oxide (ZnO). The blended material is then fired in air at a temperature from about 700° C. to about 950° C. for about 2 to about 5 hours. It is preferred that the fired material be slowly cooled to below 500° C. since a fast cooling rate will make emitting color shift to orange unless a lesser amount of manganese carbonate ($MnCO_3$) is added. Less manganese carbonate, however, causes lower brightness. As used herein, slow cooling means that the material is cooled to below about 500° C. in more than about two hours. Fast cooling means that material is cooled to below about 500° C. in less than 0.5 hours. The fired material is washed with hot deionized water, acid, and the basic solution of DTPA-NaOH-$H_2O_2$ used in the first firing step. After a final water washing to remove any remaining chemical residues, the material is dried and sifted to form a single component white-emitting electroluminescent phosphor. The finished phosphor typically has a particle size between 18 to 28 $\mu$m.

Several examples of the single component white-emitting phosphor are shown below. All phosphors were tested in conventional thick-film electroluminescent lamps operated at 100V and 400 Hz in a 50% R.H, 70° F. environment. The test lamps are comprised of a ~40 $\mu$m-thick phosphor layer and an approximately 26 $\mu$m-thick barium titanate dielectric layer. The lamps are constructed by combining the phosphor with a cyanoresin binder (Shin Etsu Co.) which has been dissolved in a mixture of acetone and dimethylformamide. In particular, the binder is made by mixing 575 g of acetone, 575 g of dimethylformamide, and 400 g of cyanoresin. The percentage of phosphor in the liquid binder is 75 wt. % and the percentage of phosphor after the binder-phosphor mix is dried is 80 wt. %. The phosphor suspension is blade coated onto a 0.007–0.0075 in.-thick PET film having a transparent, conductive layer of indium-tin oxide (ITO) (available from CPFilms). After drying, the barium titanate layer is applied over the phosphor layer in the same way using a suspension of barium titantate dispersed in the cyanoresin binder. In particular, the binder-barium titanate mix is made by mixing 375 g of cyanoresin binder, 375 g of barium titanate, and 82.5 g of dimethylformamide. The percentage of barium titanate in the binder is 45 wt. % and the percentage of barium titanate in the binder after drying is 80 wt. %. A rear electrode comprised of a 50 to 80 $\mu$m-thick graphite layer is applied to the dried barium titanate dielectric layer using a graphite suspension (Acheson Colloids). Lead wires are attached and the entire lamp is laminated with a clear, flexible film (Aclam TC200 from Honeywell Corp.) which is applied to both sides. The lamps were operated from 24 hours prior to measuring their brightness in order to stabilize the lamps and obtain representative measurements. Brightness as used herein means the brightness of the phosphor in a conventional thick-film electroluminescent lamp which has been operated at 100 V and 400 Hz for 24 hours.

EXAMPLE 1

A 550 g amount of ZnS containing about 1 wt. % chlorine was mixed with 15.58 g of a mixture of ZnS and $AuCl_3$ containing 0.5 wt. % Au, 0.55 g of anhydrous $CuSO_4$, 1.65 g of a mixture of ZnS and $Sb_2O_3$ containing 1.67 wt. % Sb, 2.86 g of zinc oxide (ZnO), 45.66 g of sulfur, and a chloride flux containing 8.56 g barium chloride ($BaCl_2$), 25.68 g magnesium chloride ($MgCl_2$), and 11.41 g sodium chloride (NaCl). The ZnS mixture was then fired in air at 1150° C. for 4 hours and 15 minutes. The fired material was fast cooled by placing the hot crucibles into a water bath. The fired material was then washed with hot deionized water several times to remove most of the chloride flux and dried at 120° C. for 15 hours. The material was mulled for 75 minutes and then washed with an acetic acid solution (2.8M) followed by a basic solution containing 4 wt. % DTPA, 2.8 wt. % NaOH, and 10 wt. % $H_2O_2$ (30% solution). The phosphor was then washed with hot deionized water and then dried at 120° C. for 15 hours to complete the first firing step.

In the second firing step, 50 g of material from the first firing step was blended with 0.25 g $CuSO_4$, 1.58 g $MnCO_3$, and 5.00 g ZnO and fired in air at 800° C. for 3 hours and 30 minutes and slowly cooled to 460° C. in furnace in 2 hours and 20 minutes. Then the fired cake was removed from the furnace and cooled naturally in air to room temperature. The fired material was washed with hot deionized water, hydrochloric acid (maintaining phosphor slurry pH between 0.7 and 1.5), and then twice with a basic solution of DTPA-NaOH-$H_2O_2$ (4.5 wt. % DTPA, 3.8 wt. % NaOH, and 10 wt. % $H_2O_2$ (30% solution)). After a final water washing, the material was dried and sifted. As shown in Table 1, this phosphor had a color comparable to a standard blended commercial white-emitting phosphor (OSRAM SYLVANIA Type 830). The Sb concentration is not shown in the Table since usually less than 7 ppm based on ICP analysis.

TABLE 1

| | Example 1 | OSRAM SYLVANIA Type 830 |
|---|---|---|
| $MnCO_3$(wt. %) added in the 2$^{nd}$ firing step | 3.16 | N/A |
| Particle size ($\mu$m) | 22 | N/A |
| ICP analysis | | |
| Au (ppm) | 99 | N/A |
| Cu (ppm) | 410 | |
| Mn (%) | 0.27 | |
| 24 hour brightness (ft-L) | 10 | 12.8 |
| EL lamp visual emission color | White | White |
| Color coordinates  x | 0.290 | 0.304 |
| y | 0.320 | 0.326 |

EXAMPLES 2–3

These two examples were made similarly to example 1 except that the amount of MnCO3 added in the second firing step was different 15 as indicated in Table 2. The data show that the increased amount of Mn shifted the color of the lamp making it appear pink in color.

TABLE 2

| Example | 2 | 3 | OSRAM SYLVANIA Type 830 |
|---|---|---|---|
| MnCO$_3$(wt. %) added in the 2$^{nd}$ firing step | 6.32 | 9.48 | N/A |
| Particle size (μm) | 22 | 23 | N/A |
| ICP analysis | | | |
| Au (ppm) | 110 | 110 | N/A |
| Cu (ppm) | 430 | 430 | |
| Mn (%) | 0.48 | 0.61 | |
| 24 hour brightness (ft-L) | 11.1 | 11.4 | 12.8 |
| EL lamp visual emission color | Light pink | Pink | White |
| Color x | 0.444 | 0.476 | 0.304 |
| Coord. y | 0.398 | 0.416 | 0.326 |

EXAMPLES 4–9

These phosphors were made similarly to Example 1 except that they were cooled differently after the second firing step as indicated in the Table. The data indicate that the 3.16 wt. % MnCO$_3$ added in the second step firing and the slow cooling to a temperature between 500 and 350° C. were good for obtaining white-emitting color. In the Table, "with a fan" means that after the second firing step, the material was cooled quickly to below approximately 200° C. within 20 minutes with help of a fan. "Natural" means that the sample was cooled naturally outside of furnace and it takes about 40 minutes to cool below 200° C. The slow cooling rate for examples 6–9 was about 2 degree per minute.

TABLE 3

| Example | 4 | 5 | 6 | 7 | 8 | 9 |
|---|---|---|---|---|---|---|
| 2$^{nd}$ step cooling | With a fan | Natural | Slowly to 650° C. | Slowly to 500° C. | Slowly to 350° C. | Slowly to 25° C. |
| Particle size (μm) | 25 | 24 | 23 | 23 | 24 | 25 |
| ICP analysis | | | | | | |
| Au (ppm) | 90 | 92 | 85 | 86 | 83 | 85 |
| Cu (ppm) | 490 | 440 | 430 | 420 | 400 | 420 |
| Mn (%) | 0.36 | 0.33 | 0.39 | 0.34 | 0.36 | 0.34 |
| 24 hour brightness (ft-L) | 8.8 | 8.1 | 8.7 | 10 | 9.1 | 7.5 |
| EL lamp visual emission color | Light orange | Light orange | Light pink | white | white | white (slight violet tint) |
| Color x | 0.471 | 0.430 | 0.445 | 0.333 | 0.328 | 0.304 |
| Coord. y | 0.422 | 0.405 | 0.407 | 0.343 | 0.351 | 0.300 |

EXAMPLE 10

This material was made similarly to Example 1 but its second firing step was performed at slightly higher temperature (850 instead of 800° C.). The data shown in Table 4 indicate that its color is slightly different than Example 1 but still in white color range. The increased firing temperature did not improve the brightness.

EXAMPLES 11–13

These phosphors were made similarly to Example 10 but with different amount of MnCO$_3$ added in the second firing step as indicated in the Table 4. The data suggest that the amount of MnCO$_3$ added in the second firing step is still preferably about 3 wt. % which is consistent with the previous examples.

TABLE 4

| Example | 10 | 11 | 12 | 13 |
|---|---|---|---|---|
| MnCO$_3$(wt. %) added in the 2$^{nd}$ firing step | 3.16 | 0.79 | 1.58 | 6.32 |
| Particle size (μm) | 23 | 23 | 23 | 23 |
| ICP analysis | | | | |
| Au (ppm) | 97 | 98 | 91 | 97 |
| Cu (ppm) | 410 | 430 | 420 | 430 |
| Mn (%) | 0.33 | 0.10 | 0.18 | 0.54 |
| 24 hour brightness (ft-L) | 8.2 | 12.2 | 9.7 | 9.2 |
| EL lamp visual emission color | White | Sky blue | Bluish white | Light orange |
| Color x | 0.360 | 0.197 | 0.234 | 0.471 |
| Coordinates y | 0.362 | 0.292 | 0.304 | 0.416 |

EXAMPLES 14–17

These phosphors were made similarly to examples 10, 11, 12, and 13, respectively, except that examples 14, 15, 16, and 17 were not slowly cooled after the second firing step. The data in Table 5 show that example 14 had the same amount of MnCO$_3$ added in the second firing step as example 11 but the color of example 14 is not white because it was not slowly cooled. By comparing examples 10 and 14, it can be seen that less Mn was doped into lattice upon slow cooling even though the amounts of MnCO$_3$ added were the same. The data also indicate that when the fired material is not slowly cooled, the amount of Mn needs to be lowered in order to obtain a white color as demonstrated by example 15, which had lower Mn and lower x and y color coordinates. The lower amount of Mn, however, causes lower brightness as seen in example 15, which had a lower brightness compared to examples 1, 7, 8, and 11. Thus, a slow cooling is preferred because it allows for a higher Mn concentration in the lattice which is good for brightness.

TABLE 5

| Example | 14 | 15 | 16 | 17 |
|---|---|---|---|---|
| MnCO$_3$(wt. %) added in the 2$^{nd}$ firing step | 3.16 | 0.79 | 1.58 | 6.32 |
| Particle size (μm) | 22 | 23 | 23 | 23 |
| ICP analysis | | | | |
| Au (ppm) | 110 | 100 | 100 | 100 |
| Cu (ppm) | 480 | 460 | 450 | 450 |
| Mn (%) | 0.43 | 0.14 | 0.29 | 0.76 |
| 24 hour brightness (ft-L) | 9.3 | 7.1 | 6.5 | 13.5 |
| EL lamp visual emission color | Light orange | Bluish white | Pale Pink | Orange |

TABLE 5-continued

| Example | | 14 | 15 | 16 | 17 |
|---|---|---|---|---|---|
| Color | x | 0.515 | 0.262 | 0.418 | 0.538 |
| Coordinates | y | 0.439 | 0.325 | 0.391 | 0.455 |

EXAMPLES 18–21

These phosphors were made similarly to examples 10, 11, 12, and 13, respectively, except that examples 18, 19, 20, and 21 had 0.087 wt. % (instead of 0.04 wt. %) of Cu added in the first firing step. The higher Cu concentration in these examples increased the y color coordinate and made it relatively stable (less affected by the amount of Mn).

TABLE 6

| Example | | 18 | 19 | 20 | 21 |
|---|---|---|---|---|---|
| MnCO$_3$(wt. %) added in the 2$^{nd}$ firing step | | 3.16 | 0.79 | 1.58 | 6.32 |
| Particle size (μm) | | 25 | 24 | 25 | 25 |
| ICP analysis | | | | | |
| Au (ppm) | | 65 | 67 | 68 | 70 |
| Cu (ppm) | | 660 | 680 | 680 | 680 |
| Mn (%) | | 0.30 | 0.09 | 0.18 | 0.53 |
| 24 hour brightness (ft-L) | | 11.0 | 19.9 | 14.1 | 8.7 |
| EL lamp visual emission color | | Greenish White | Green | Greenish White | Light orange |
| Color | x | 0.305 | 0.205 | 0.235 | 0.420 |
| Coordinates | y | 0.405 | 0.399 | 0.398 | 0.425 |

EXAMPLES 22–25

These phosphors were made similarly to examples 10, 11, 12, and 13, respectively, except that examples 22, 23, 24, and 25 had 0.03 wt. % (instead of 0.04 wt. %) of Cu added in the first firing step. With the smaller amount of Cu added in these examples, both the x and y coordinates increased with increased Mn.

TABLE 7

| Example | | 22 | 23 | 24 | 25 |
|---|---|---|---|---|---|
| MnCO$_3$(wt. %) added in the 2$^{nd}$ firing step | | 3.16 | 0.79 | 1.58 | 6.32 |
| Particle size (μm) | | 24 | 24 | 24 | 24 |
| ICP analysis | | | | | |
| Au (ppm) | | 99 | 100 | 100 | 110 |
| Cu (ppm) | | 350 | 360 | 360 | 350 |
| Mn (%) | | 0.28 | 0.10 | 0.16 | 0.52 |
| 24 hour brightness (ft-L) | | 7.5 | 9.3 | 7.8 | 8.2 |
| EL lamp visual emission color | | Bluish white | Blue | Light blue | Light orange |
| Color | x | 0.309 | 0.187 | 0.222 | 0.455 |
| Coordinates | y | 0.298 | 0.220 | 0.243 | 0.393 |

EXAMPLE 26

This phosphor was made similarly to example 1 in general except for the following: (1) no Au and Sb were added during the entire process; (2) 0.06 wt. % Cu was added in the first firing step; (3) the chloride flux composition for the first firing step was 3.06 wt. % BaCl$_2$, 3.06 wt. % MgCl$_2$, and 2.04 wt. % NaCl; and (4) 6.32 wt. % (instead of 3.16 wt. %) MnCO$_3$ was added in the second firing step. The results for this example demonstrate that Au and Sb are optional in terms of the color requirement.

TABLE 8

| | | Example 26 |
|---|---|---|
| MnCO$_3$(wt. %) added in the 2$^{nd}$ firing step | | 6.32 |
| Particle size (μm) | | 24 |
| ICP analysis | | |
| Au (ppm) | | N/A |
| Cu (ppm) | | 570 |
| Mn (%) | | 0.41 |
| 24 hour brightness (ft-L) | | 9.1 |
| EL lamp visual emission color | | Light-bluish white |
| Color | x | 0.377 |
| Coordinates | y | 0.417 |

While there has been shown and described what are at the present considered the preferred embodiments of the invention, it will be obvious to those skilled in the art that various changes and modifications may be made therein without departing from the scope of the invention as defined by the appended claims.

We claim:

1. A single-component white-emitting electroluminescent phosphor having an emission having an x color coordinate of 0.23 to 0.41 and a y color coordinate of 0.25 to 0.42.

2. The phosphor of claim 1 wherein the emission has an x color coordinate of 0.28 to 0.38 and a y color coordinate of 0.28 to 0.38.

3. The phosphor of claim 1 wherein the emission has an x color coordinate of 0.31 to 0.35 and a y color coordinate of 0.32 to 0.38.

4. The phosphor of claim 1 wherein the brightness of the phosphor is greater than 7 foot-Lamberts when operated in a thick-film electroluminescent lamp at 100V and 400 Hz.

5. A single-component white-emitting electroluminescent phosphor comprising zinc sulfide activated with copper, manganese, chlorine, and, optionally, one or more metals selected from gold and antimony, the phosphor having an emission having an x color coordinate of 0.23 to 0.41 and a y color coordinate of 0.25 to 0.42.

6. The phosphor of claim 5 wherein the emission has an x color coordinate of 0.28 to 0.38 and a y color coordinate of 0.28 to 0.38.

7. The phosphor of claim 5 wherein the emission has an x color coordinate of 0.31 to 0.35 and a y color coordinate of 0.32 to 0.38.

8. The phosphor of claim 5 wherein the brightness of the phosphor is greater than 7 foot-Lamberts when operated in a thick-film electroluminescent lamp at 100V and 400 Hz.

9. The phosphor of claim 5 wherein the phosphor contains from about 0.1 to about 0.6 weight percent manganese, about 0.02 to about 0.08 weight percent copper, about 0.002 to about 0.02 weight percent chlorine, 0 to about 0.012 weight percent gold, and 0 to about 0.0007 weight percent antimony.

10. A method for making a single-component white-emitting electroluminescent phosphor comprising:
(a) forming a first mixture by combining amounts of zinc sulfide, a source of copper, zinc oxide, sulfur, a chloride-containing flux, and, optionally, a source of one or more metals selected from gold and antimony;

(b) firing the first mixture in air at a temperature from about 1100° C. to about 1250° C. for about 3 to about 5 hours to form a first-fired material;

(c) washing the first-fired material to remove the flux;

(d) mulling the first-fired material to induce defects in the crystal structure;

(e) washing the first-fired material to further remove flux residues and copper sulfides;

(f) forming a second mixture by combining the first-fired material with amounts of a copper source, a manganese source, and zinc oxide;

(g) firing the second mixture in air at a temperature from about 700° C. to about 950° C. for about 2 to about 5 hours to form a second-fired material; and (h) washing the second-fired material to remove chemical residues to form the phosphor.

11. The method of claim 10 wherein the first mixture contains in weight percent relative to the weight of zinc sulfide: 0 to 0.018 wt. % Au, 0.02 to 0.1 wt. % Cu, 0 to 0.01 wt. % Sb, 0.3 to 0.7 wt. % ZnO, 6 to 12 wt. % sulfur, and 4 to 14 wt. % chloride-containing flux.

12. The method of claim 11 wherein the second mixture is made by combining the first-fired material with 0.2 to 0.8 wt. % anhydrous copper sulfate, 0.7 to 7 wt. % manganese carbonate, and 5 to 15 wt. % zinc oxide.

13. The method of claim 10 wherein the second-fired mixture is slowly cooled after firing to below 500° C.

14. The method of claim 12 wherein the chloride-containing flux contains alkali metal and alkaline earth chlorides.

15. The method of claim 14 wherein the chloride-containing flux contains barium chloride, magnesium chloride, and sodium chloride.

16. A method for making a single-component white-emitting electroluminescent phosphor comprising:

(a) forming a first mixture by combining amounts of zinc sulfide, a source of copper, zinc oxide, sulfur, a chloride-containing flux, and, optionally, a source of one or more metals selected from gold and antimony, the first mixture containing in weight percent (wt. %) relative to the weight of zinc sulfide: 0 to 0.018 wt. % Au, 0.02 to 0.1 wt. % Cu, 0 to 0.01 wt. % Sb, 0.3 to 0.7 wt. % ZnO, 6 to 12 wt. % sulfur, and 4 to 14 wt. % chloride-containing flux;

(b) firing the first mixture in air at a temperature from about 1100° C. to about 1250° C. for about 3 to about 5 hours to form a first-fired material;

(c) water washing, drying, and gently mulling the first-fired material to induce defects in its crystal structure;

(d) washing the first-fired material with an acidic solution and then a basic solution containing sodium hydroxide, hydrogen peroxide, and a chelating agent;

(e) forming a second mixture by combining the first-fired material with 0.2 to 0.8 wt. % anhydrous copper sulfate, 0.7 to 7 wt. % manganese carbonate, and 5 to 15 wt. % zinc oxide (ZnO);

(f) firing the second mixture in air at a temperature from about 700° C. to about 950° C. for about 2 to about 5 hours followed by a slow cooling to below 500° C.;

(g) washing the second-fired material sequentially with hot deionized water, an acidic solution, and then a basic solution containing sodium hydroxide, hydrogen peroxide, and a chelating agent;

(h) rinsing the washed material from step (g) with water and drying to form the phosphor.

17. The method of claim 16 wherein the basic solution in steps (d) and (g) contains in weight percent relative to the weight of the material being washed: 2 to 4 wt. % diethylenetriaminepentaacetic acid, 2.5 to 3.5 wt. % sodium hydroxide, and 5 to 15 wt. % of a 30% hydrogen peroxide solution.

18. The method of claim 16 wherein the first mixture contains in weight percent relative to the weight of zinc sulfide: 0 to 4 wt. % of barium chloride, 1 to 5 wt. % of magnesium chloride, and 1 to 5 wt. % of sodium chloride.

19. An electroluminescent lamp having a single-component white-emitting phosphor having an emission having an x color coordinate of 0.23 to 0.41 and a y color coordinate of 0.25 to 0.42.

20. The lamp of claim 19 wherein the emission has an x color coordinate of 0.28 to 0.38 and a y color coordinate of 0.28 to 0.38.

21. The lamp of claim 19 wherein the emission has an x color coordinate of 0.31 to 0.35 and a y color coordinate of 0.32 to 0.38.

* * * * *